United States Patent
Fischer et al.

(10) Patent No.: US 9,221,115 B2
(45) Date of Patent: Dec. 29, 2015

(54) SOLDERING IRON

(71) Applicant: Apex Brands, Inc., Apex, NC (US)

(72) Inventors: Thomas Fischer, Bietigheim (DE); Stephan Hofmann, Pleidelsheim (DE)

(73) Assignee: APEX BRANDS, INC., Apex, NC (US)

( * ) Notice: Subject to any disclaimer, the term of this patent is extended or adjusted under 35 U.S.C. 154(b) by 101 days.

(21) Appl. No.: 13/975,671

(22) Filed: Aug. 26, 2013

(65) Prior Publication Data

US 2014/0061182 A1 Mar. 6, 2014

(30) Foreign Application Priority Data

Aug. 29, 2012 (DE) ..................... 20 2012 008 255 U

(51) Int. Cl.
*H05B 3/42* (2006.01)
*B23K 26/00* (2014.01)
*B23K 3/03* (2006.01)
*B23K 3/02* (2006.01)

(52) U.S. Cl.
CPC ................. *B23K 3/0384* (2013.01); *B23K 3/02* (2013.01)

(58) Field of Classification Search
CPC ................................ B23K 3/02; B23K 3/0384
USPC ......... 219/85.1, 121.6, 121.63, 229, 230, 232
See application file for complete search history.

(56) References Cited

U.S. PATENT DOCUMENTS

| | | | |
|---|---|---|---|
| 4,534,811 A | 8/1985 | Ainslie et al. | |
| 5,565,119 A | 10/1996 | Behun et al. | |
| 5,904,868 A | 5/1999 | Economikos et al. | |
| 5,948,286 A | 9/1999 | Chalco et al. | |

FOREIGN PATENT DOCUMENTS

| | | |
|---|---|---|
| DE | 4017286 A1 | 12/1991 |
| DE | 19601181 A1 | 7/1997 |
| EP | 0150305 B1 | 8/1985 |
| EP | 0367705 A2 | 5/1990 |
| WO | 2009156505 A1 | 12/2009 |

OTHER PUBLICATIONS

International Search Report provided by German Patent Office, dated Nov. 20, 2013 relating to German priority application No. 20 2012 008 255.8 filed Aug. 29, 2012.

*Primary Examiner* — Dana Ross
*Assistant Examiner* — Lindsey C Teaters
(74) *Attorney, Agent, or Firm* — Coats & Bennett, PLLC

(57) ABSTRACT

A soldering iron includes a soldering tip which is adapted to be heated by means of a laser beam traveling at least partially along a laser path in the soldering iron. The soldering iron further includes an energy converter provided for absorbing the laser beam and coupled to the soldering tip for heating the same.

20 Claims, 2 Drawing Sheets

SOLDERING IRON

This application claims the benefit of German Utility Model Application No. 20 2012 008 255.8, filed 29 Aug. 2012, the disclosure of which is incorporated herein by reference in its entirety.

FIELD OF THE INVENTION

The present invention relates to a soldering iron.

BACKGROUND

It is known that a soldering tip can be heated by means of a current-carrying resistor, e.g., a wound coil or an arbitrarily shaped resistance wire. Heat transfer between the current-carrying resistor and the soldering tip can advantageously be accomplished, especially when the resistor is in direct contact with the soldering tip. However, the resistor provided for heating the soldering tip is subject to increased wear, especially when high currents are temporarily conducted therethrough. Another negative aspect is that the production of current-carrying wound resistors is expensive and that wound resistors are difficult to install in the soldering iron. In addition, current-carrying resistors require a certain warm-up time for heating the corresponding soldering tip to its operating temperature. Also, the material properties of the current-carrying resistor may change over time due to the repeated application of current, which may lead to non-uniform heating of the soldering tip, whereby the work result may deteriorate. This may, for example, have a negative influence on the quality of the soldering seam.

For accomplishing a focused, high, as well as fast, heat input in the workpieces to be processed, laser soldering processes are used in practice. Laser soldering is preferably used in automated processes by means of robots. This is due to the fact that a laser beam must be guided by the robot precisely along the workpieces to be processed so as to keep the heat input through the laser beam constant. Note that it is essential that the laser beam is guided at a constant distance from the soldering joint so as to prevent damage to the workpieces.

In the case of hand-held laser soldering irons, the laser beam exits the soldering iron and impinges directly on the workpieces to be processed. The exiting laser beam may, if used improperly, cause serious injuries to the user and damage to the workpieces to be processed.

In view of an increased risk of injuries and inadequate results in the processing of workpieces, hand-held laser soldering irons have been used very rarely up to now. This is especially also due to the fact that the precision with which the user can guide the hand-held soldering iron across the workpieces to be processed is much lower than that which can be achieved by means of a robot.

DE 40 17 286 A1 discloses a laser device with a soldering tip including a blind hole having a light conductor inserted in the open end thereof. At an end located adjacent the working end, the blind hole can be tapered, and the laser energy exiting the light conductor enters the hole adjacent the working end of the soldering tip and is there converted into thermal energy used for heating the working end of the soldering tip.

DE 196 01 181 A1 discloses a soldering device with a soldering tip configured as a hollow body and having a light-absorbing internal surface onto which a laser beam is directed via a light conductor. The temperature of the soldering tip is measured by means of a temperature sensor fixed to the outer wall of soldering tip, the measuring signal being adapted to be supplied to a laser control unit via a connection line.

U.S. Pat. No. 5,948,286 discloses a soldering device comprising a laser unit, an ultrasonic unit, and a soldering tip in the interior of which a light conductor is guided. The light conductor ends a short distance before the closed end of the soldering tip, whereby a gap having a size of approximately two to ten millimeters is formed.

U.S. Pat. No. 5,904,868 discloses a laser tool with a soldering tip heated by means of laser beams. The soldering tip has provided therein a blind hole for accommodating an electrical component. By means of the soldering tip heated by laser beams, the electrical component can be secured to and released from a substrate. At one end of the soldering tip, a laser energy absorbing material is provided, which establishes a thermal bridge to the component.

U.S. Pat. No. 5,565,119 discloses an apparatus including a plurality of laser soldering tips, each of these soldering tips being configured as a hollow element and heated by laser beams. In this apparatus soldering work can be done simultaneously at several points.

EP 0 150 305 B1 discloses an apparatus for bonding circuit elements, comprising a soldering tip which receives a laser beam, the energy of the laser beam being absorbed for heating the soldering tip. For an improved absorption degree of the laser energy, the internal surface of the soldering tip includes a black body surface.

EP 0 367 705 A2 discloses an ultrasound-assisted laser soldering apparatus. The laser soldering apparatus includes a soldering tip configured as a hollow element and providing an open end as well as a closed end. A ceramic sleeve is arranged in the interior of the soldering tip for holding a light conductor. Optionally, the soldering tip provides an absorbent coating applied to the closed end of the soldering tip. The optical coating allows particularly fast heating of the conical end of the soldering tip, an effect which, optionally, may additionally be enhanced by a roughened surface.

WO 2009/156505 A1 discloses a device for soldering metallic components, including a nozzle body having a transfer element at one end thereof, the transfer element being configured as a contact pressure device. The transfer element transfers thermal energy to the components to be joined.

Heating the soldering tip quickly and uniformly and keeping it on a constant temperature level is difficult in the case of known laser devices. Also, in known soldering devices, the material properties of the soldering tip may change in the course of time due to direct irradiation of the soldering tip with a laser beam, and this change of material properties may lead to irregular operating results.

In the light of the problems described with reference to the known prior art, three remains a need for a soldering iron which, by means of simple structural features, is ready to operate within a short period of time and offers a high soldering capacity without becoming dangerous for the user. Advantageously, the device would provide an efficient and low-priced method of heating a soldering iron quickly to its operating temperature.

SUMMARY

Taking into account the drawbacks of the known practice mentioned at the beginning, the present invention provides a soldering iron with a soldering tip which is adapted to be heated by means of a laser beam traveling at least partially along a laser path in the soldering iron. In contrast to known, automatic or manually guided laser soldering irons, the soldering iron according to the present invention is configured such that the laser beam does not leave the soldering iron, i.e., it is not directly guided onto the workpieces to be processed.

The soldering iron according to the present invention is, however, configured such that the laser power serves to heat a soldering tip provided on the soldering iron. The laser beam does therefore not exit the soldering iron. This means that in the case of the present invention the laser power generated by the laser beam is converted into thermal energy already inside the soldering iron, the thermal energy being, however, not used for fusing a soldering wire, as is done in the prior art, but for heating the soldering tip of the soldering iron.

According to the present invention, the laser beam travels at least partially along a laser path within the soldering iron. The term laser path describes here the distance between the unit provided for generating the laser beam, e.g., a laser diode, and the focus, the focus marking the point at which the laser beam impinges, no matter whether this is a point directly on the soldering tip to be heated or on the energy converter, which will be described in more detail further down and which allows the heat to be conveyed to the soldering tip. Depending on where the unit for generating a laser beam is installed, the laser path traveled by the laser beam therefore extends fully within the soldering iron, when the laser-generating unit is provided within the soldering iron, or only partly within the soldering iron, when the laser-generating unit is provided within a soldering station connected to the soldering iron. This will also be explained further down making reference to the figures.

By means of the laser beam used for heating the soldering tip, the soldering tip can quickly be heated to its operating temperature. In addition, the laser beam is not subjected to wear that would be comparable to that occurring in the case of the wound resistor or resistance wire mentioned at the beginning.

Another advantage is that energy transfer of the laser beam requires little space in the soldering iron, whereby the size of the soldering iron as well as the manufacturing costs can be reduced. Likewise, the soldering iron according to the present invention requires a reduced number of components and can thus be assembled easily.

Another particularly important aspect is that the laser beam allows constant heating of the soldering tip of the soldering iron according to the present invention, i.e., heating with a constant energy input, so that a uniformly heated soldering tip will be available for the user's work. A product processed by the soldering iron according to the present invention can thus be produced on a high and stable quality level.

Preferably, the energy input by means of the laser beam into the soldering tip is constant. The soldering tip can thus be maintained at a uniform temperature when the soldering iron is in operation, whereby the user's work with the soldering iron is facilitated and improved work results are achieved. A constant energy input can especially be achieved when the laser power of the laser beam remains constant for a predetermined period of time. Depending on the desired soldering tip temperature, the laser power may, however, also be variably adjustable. The soldering iron can thus be used for processing different workpieces and solder materials. A special advantage can be accomplished when the laser power is continuously variable so that the soldering tip temperature can be adapted to different frame conditions in a particularly effective manner. The laser power may, for example, be adjusted directly at the soldering iron and/or at a soldering station provided.

According to a special embodiment of the invention, the soldering iron comprises an energy converter provided for absorbing the laser beam and coupled to the soldering tip for heating the same. The laser beam impinges here directly onto the energy converter so that the latter will absorb the laser power inherent in the laser beam. The laser power absorbed by the energy converter causes the latter to be heated, the thermal energy generated in the energy converter being, for the purpose of heating, transferable to the soldering tip coupled to the energy converter. The energy converter especially allows punctiform absorption of the laser power, whereas emission of the laser power to the soldering tip can take place uniformly across at least parts of the surface of the energy converter in the form of thermal energy. The soldering tip of the soldering iron according to the present invention used for processing workpieces can thus be heated uniformly and quickly, so that a high-quality result in the processing of workpieces can be achieved by this soldering tip.

It will also be of advantage when an input of energy into the energy converter by means of the laser beam is constant. It is thus possible to produce by means of the energy converter a constant transfer of heat to the soldering tip coupled to the energy converter, whereby an improved work result is achieved. In addition, it will be useful when the energy converter is configured for absorbing a variable energy output so that it can be used for transferring different thermal energy volumes to the soldering tip.

For absorbing a higher laser power, the energy converter is preferably so conceived that it is fully or partly heat treated. Full microstructural transformation of the energy converter may be caused e.g., by annealing or hardening. For causing a microstructural transformation only down to a certain depth of the surface of the energy converter, a diffusion method, such as case hardening, may be used.

A particularly high laser power can also be absorbed by the energy converter if the latter is at least partially coated. To this end, the energy converter can be treated by means of a coating method, such as boriding or nitriding. The surface layer applied to the energy converter can prevent wear and tear, e.g., chemical reactions, on the surface of the energy converter as a result of laser beam absorption.

According to a further embodiment of the invention the laser source is configured such that, or the laser beam is adapted to be guided within the soldering iron such that the laser beam focus is before, on or behind a surface of the soldering tip to be heated or the energy converter to be heated. When the focus of the laser beam lies before or behind the absorbing surface of the soldering tip or of the energy converter, wear of the soldering tip or of the energy converter can be reduced, since the soldering tip or the energy converter absorb less energy output per unit area. The enlarged area of energy input in the case of this embodiment also allows improved homogeneous heating of the soldering tip and of the energy converter, respectively. However, directing the laser beam focus onto the surface of the soldering tip or the energy converter will provide shorter heating times, so that the soldering iron can be heated more quickly to its operating temperature. Likewise, it is imaginable that the laser source generating the laser beam is configured for adjusting the laser beam focus such that it is located at different distances relative to the surface of the soldering tip or energy converter to be heated, especially at a variable distance of ±3 cm, so that the heating times of the soldering iron are variable.

A particularly high absorption rate can especially be accomplished when the energy converter has a surface which is at least partially black, preferably at the point of the focus of the laser beam.

An effective transfer of heat from the energy converter to the soldering tip can especially be accomplished when the energy converter is in direct contact with the soldering tip. A particularly fast and large heat transfer from the energy converter to the soldering tip will thus be possible.

According to a further embodiment, the soldering tip may enclose the energy converter at least partially, so that a sufficiently large area is available for heat transfer, and also this will allow fast heating of the soldering tip.

The energy converter is preferably arranged concentrically with the soldering tip. This entails the technical effect that the soldering tip can be heated uniformly to a desired operating temperature and that energy losses can be reduced.

For allowing the soldering tip to be quickly demounted it may, according to a further embodiment, be of advantage when the energy converter is releasably connected to the soldering tip. It would, for example, be possible to configure the soldering tip such that it can be plugged onto the energy converter or attached thereto by means of a screw-type connection. Whereas a soldering tip that is adapted to be plugged onto the energy converter is particularly suitable for fast exchange, a connection by means of screws allows particularly stable fixing between the energy converter and the soldering tip.

It may also be expedient when the energy converter is formed integrally with the soldering tip. It is thus possible to prevent the soldering tip from loosening from the energy converter during operation, and also the heat transfer coefficient at a boundary surface between the energy converter and the soldering tip can be improved in this way. A particularly advantageous integral structural design of the energy converter and the soldering tip can be accomplished by forming the soldering tip on the energy converter by means of a casting process. This will provide a particularly efficient transfer of heat from the energy converter to the soldering tip.

According to another embodiment of the invention, the energy converter comprises a rotationally symmetric body. Such a body can be produced easily and at a reasonable price and it can provide for a particularly effective heat transfer between the energy converter and the soldering tip coupled thereto.

A further advantageous embodiment of the invention is so conceived that the energy converter has a concave, in particular conical surface which faces the laser beam. The laser power absorption rate can be optimized in this way. Laser beams which may be reflected by the concave surface of the energy converter can be absorbed before leaving the concave surface area, so that the absorption rate increases. According to an embodiment which is easy to produce, the energy converter may, however, also have a flat surface which faces the laser beam.

An increased absorption rate as well as a reduced reflection rate of the laser beam can be accomplished by providing in the energy converter or the soldering tip a blind hole into which the laser beam can enter. It is thus especially possible to prevent reflected beams from leaving the blind hole and to keep them inside the blind hole where they serve to heat the energy converter or the soldering tip.

For reducing the amount of reflected laser beams it may be of advantage when the laser beam can be directed onto the surface of the energy converter substantially at right angles thereto. A particularly high amount of laser energy can thus be input into the energy converter.

Another advantageous embodiment is so conceived that the laser beam scans the surface of the soldering tip or of the energy converter along a pattern, e.g., along a meandering path, so as to provide energy input at various locations. This allows particularly careful heating of the soldering tip or the energy converter.

For improved, in particular fast heating of the soldering tip, the shape of the energy converter may preferably correspond to a scaled-down shape of the soldering tip. This may entail advantages especially as regards production as well as the assembly of the soldering tip and the energy converter.

According to another embodiment of the invention, the energy converter may include an absorption disk, preferably in cylindrical form, which faces the laser beam. The absorption disk can be used for reliably fixing the energy converter in the soldering iron as well as on the soldering tip. Likewise, the absorption disk may be provided for absorbing the laser power generated by the laser beam with little losses as well as for distributing this laser power in the form of heat to the rest of the energy converter.

Preferably, the energy converter includes at least one conductor section. The conductor section can be used for fixing the energy converter to the soldering tip. The conductor section may also be shaped such that it allows advantageous heat transfer up to and into the interior of the soldering tip.

A further advantageous embodiment of the invention is so conceived that the conductor section projects into the soldering tip in a finger-shaped configuration. The conductor section may preferably be provided with an external thread that is adapted to be screwed into an internal thread provided in the soldering tip. The soldering tip can thus fixedly be screwed onto the energy converter, the threads providing also a surface enlargement and consequently an improved heat transfer between the energy converter and the soldering tip.

A further optional embodiment of the invention is to be seen in that the laser beam is adapted to be conveyed by means of a light conductor arranged at least within the soldering iron, the light conductor extending primarily along the laser path. The light conductor allows flexible conveying of the laser radiation. It is possible to conduct the light conductor along at least a portion of the laser path. The light conductor may, for example, be oriented perpendicularly relative to the surface of the energy converter at which absorption of the laser beam takes place. This is, however, not absolutely necessary. The light conductor may just as well be oriented, at least along certain sections thereof, such that it does not extend perpendicular to the surface of the energy converter.

According to a particularly advantageous embodiment of the invention, an exit opening of the light conductor is arranged at a constant distance from the energy converter, i.e., from the absorption surface and/or from the soldering tip. The laser power absorbed by the soldering tip and the energy converter, respectively, can thus be kept constant. This supports uniform heating of the soldering tip, whereby the processing quality of the workpieces can be improved.

For an optimized transmission of the laser beam, the light conductor may comprise optical fibers. These optical fibers ensure that power losses along the light conductor will be prevented.

For a stationary orientation of the light conductor within the soldering iron, a holder may be provided. The holder is used for fixing and orienting the light conductor within the soldering iron. In particular, the holder is fixed at a location close to the exit opening of the light conductor, so that the exit opening can be fixed stably within the soldering iron and, primarily, at an invariable distance from the absorption surface of the soldering tip or the energy converter.

According to a further embodiment of the invention, a laser source is provided for generating the laser beam, the laser source being preferably arranged within the soldering iron. By means of the laser source the laser beam required can be generated, the laser beam transferring the necessary laser power for quickly and effectively heating the soldering tip.

According to a preferred embodiment of the invention, the soldering iron includes at least one diode laser as a laser source. In order to accomplish an improved energy input into the soldering tip and the energy converter, respectively, the at least one diode laser is configured for operating in a wavelength range between 500 nm and 1500 nm. In this wavelength range, a particularly high absorption rate, i.e., a high energy input into the energy converter or the soldering tip can be achieved.

In order to accomplish by means of the energy converter or the soldering tip an absorption degree of almost 90% of the laser beam power, the surface of the energy converter or the soldering tip onto which the laser beam is directed is preferably roughened. When the laser beam impinges on a rough surface of the energy converter or the soldering tip, the amount of reflected beams can be reduced substantially. Even the small number of reflected beams does not remain in the focused area and does normally not have an intensity that would be worth mentioning, so that heating of the soldering iron in undesired parts thereof will be prevented.

Preferably, the laser source is configured for pulsed operation. The laser source used may be a short pulse laser or an ultra-short pulse laser. A pulse laser especially provides very high peak intensities. Another advantage is to be seen in that the heating of the energy converter or of the soldering tip can effectively be controlled by means of a pulse laser. Alternatively to the pulse laser, a continuous-wave laser (CW laser) may, however, be used as a laser source.

Another embodiment of the invention is so conceived that the soldering iron includes a temperature sensor configured for sensing the temperature of the soldering tip and/or of the energy converter. Preferably, the temperature sensor is functionally connected to a control unit configured for detecting as control input signals the temperature values sensed by the temperature sensor and generating on the basis of these control input signals a control variable for operating the laser source, so that the laser power of the laser source can be controlled as a function of a temperature sensed by the temperature sensor at the energy converter and the soldering tip, respectively. An effective temperature control of the soldering tip and/or the energy converter can thus be realized easily. Optionally, a continuous or temporary control of the laser power by the control unit can be realized.

According to a further embodiment, the laser source for generating the laser beam may comprise at least one laser diode. Preferably, a power of at least 10 Watts, in particular however 20 Watts, can be accomplished by means of the laser diode. It is thus possible to achieve a particularly high energy input for heating the soldering tip. Preferably, the laser diode is coupled to the light conductor such that the laser beam generated by the laser diode can easily be taken up by the light conductor and directed onto the energy converter and the soldering tip, respectively.

For improved use, the soldering tip and/or the energy converter primarily comprise(s) a thermally conductive, in particular metallic material. Preferably, the soldering tip and/or the energy converter comprise(s) aluminum, iron, steel, stainless steel, silver, gold, nickel and/or copper, so as to guarantee an effective transfer of heat. As has already been described above in connection with the energy converter, also the soldering tip may be heat treated fully or partly, in particular at least sectionwise on its surface according to one embodiment. It is thus possible to make use of the methods which have already been mentioned in connection with the energy converter. Particularly good heating of the soldering tip can also be accomplished, when the soldering tip includes a rotationally symmetric body. The energy converter is, preferably by means of a casting process, configured as a volume absorber for the laser beam and is especially produced from a formable material, such as glass, ceramics, gel, a crystalline material, liquid and/or the above-mentioned metals.

The invention also relates to a soldering system comprising a soldering station and a soldering iron according to one of the above described embodiments. Preferably, the soldering station is connected to the soldering iron via a line. According to one embodiment, the light conductor may be arranged such that it extends at least partially in the line. The laser beam can thus be conducted through the line by means of the light conductor.

Alternatively to an arrangement of the laser source directly in the soldering iron, the laser source may also be provided in the soldering station. The laser beam generated by the laser source is then conveyed to the soldering iron via the light conductor arranged in the line.

However, when the laser source is positioned in the soldering iron, the line provided between the soldering station and the soldering iron is configured as an electric cable so as to supply the laser source with power for generating the laser beam. In this case, a light conductor need not be provided within the line.

In addition, the invention may refer to a method of heating a soldering tip of a soldering iron. According to the present invention, the soldering tip is heated by means of a laser beam traveling at least partially along a laser path in the soldering iron.

According to a special embodiment, the laser beam is directed onto an energy converter coupled to the soldering tip. The energy converter is used for absorbing the laser power, and the heat produced therein is transferred to the soldering tip coupled to the energy converter. Preferably, the laser beam is generated by a laser source provided in the soldering iron or in a soldering station connected to the soldering iron.

The laser beam is conducted preferably at least partially along a laser path by means of a light conductor within the soldering iron. Making use of the light conductor, the laser beam can be directed onto a specific point on a surface, e.g., on a surface of the energy converter.

It will also be advantageous when a distance between an exit opening of the light conductor and the energy converter is kept constant. In this way it can be achieved that an energy input into the energy converter remains constant, whereby uniform heating of the soldering tip can be accomplished. To this end, in particular a holder can be used.

BRIEF DESCRIPTION OF THE DRAWINGS

Embodiments of the invention will be described in more detail with reference to the following figures.

DETAILED DESCRIPTION

Figure 1:
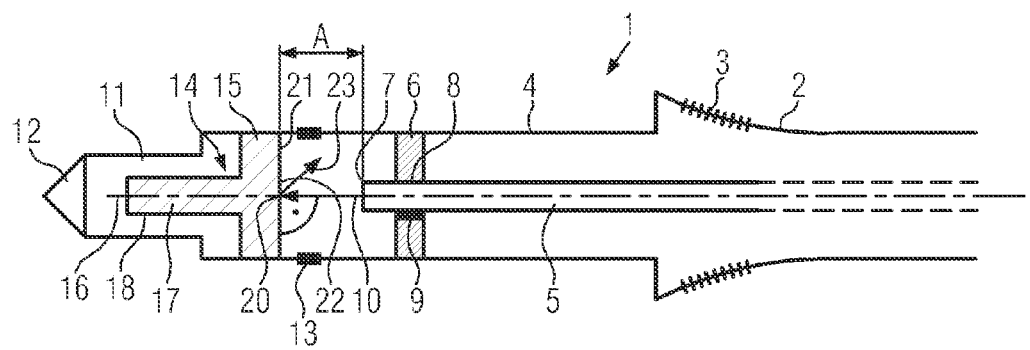
FIG. 1 shows a sectional view of a first embodiment of the soldering iron according to the present invention.

FIG. 1 shows a soldering iron 1 according to an embodiment of the present invention. For a better representation of the features according to the invention, the soldering iron 1 is shown in a sectional view. The soldering iron 1 comprises a handle 2. A user can take hold of the soldering iron 1 at the handle 2 so as to guide the soldering iron 1 safely for processing workpieces, e.g., for forming a soldering seam between the workpieces to be processed. The handle 2 can be produced from a plastic material for better gripping on the part of the user. In particular, the handle 2 may include a fluted area 3, preferably at the location where the user applies his fingers. By means of the fluted area 3, the user's hand can be prevented from slipping off the handle 2. The fluted area 3 may also be replaced or supplemented by the use of an anti-slip material, e.g., a rubber coating.

The soldering iron 1 also comprises a head section 4. The head section 4 is fixed to the handle 2. The head section 4 may releasably be fixed to the handle 2, e.g., by means of a screw-type connection. Alternatively, the handle 2 may also be formed integrally with the head section 4.

A light conductor 5 extends inside the head section 4. According to the embodiment of FIG. 1, the light conductor 5 extends along a substantial portion of the head section 4 as well as within the handle 2. The light conductor 5 can be oriented within the head section 4 by means of a holder 6. The holder 6 is preferably fixed in the head section 4 in a stable manner so as to hold an exit opening 7 of the light conductor 5 stationary within the head section 4. For example, the holder 6 may be formed integrally with the head section 4. According to another embodiment, the holder 6 may also be arranged releasably within the head section 4, e.g., by a screw-type connection. The holder 6 has formed therein a holder opening 8 through which the light conductor 5 extends. The holder opening 8 may have provided therein a clamping unit 9 guaranteeing stable fixing of the light conductor 5. The clamping unit 9 may, for example, hold the light conductor 5 within the holder opening 8 by a force fit so that the exit opening 7 can be stationarily positioned within the head section 4. In order to prevent a transfer of heat between the light conductor 5 and the head section 4, the clamping unit 9 and/or the holder 6 may preferably be produced from a thermally insulating material.

The light conductor 5 is provided for conveying a laser beam 10. For conveying the laser beam 10, the light conductor 5 may, for example, comprise optical fibers. As will be explained in more detail hereinbelow, the laser beam 10 serves to heat a soldering tip 11. The soldering tip 11 is secured to the head section 4. The soldering tip 11 includes a head 12 configured for processing workpieces. The head 12 may have different shapes for processing workpieces. According to FIG. 1, the head 12 has the shape of a pointed cone.

The soldering tip 11 and/or the head section 4 include fixing means 13 configured to fix the soldering tip 11 to the head section 4. The fixing means 13 may, for example, comprise a screw connection. Alternatively, the fixing means 13 may merely be configured as a plug connection holding the soldering tip 11 on the head section 4 via a frictional or magnetic-force connection.

Within the soldering tip 11 an energy converter 14 is provided. According to FIG. 1, the energy converter 14 extends within the soldering tip 11. Alternatively, the invention may, however, be configured such that the energy converter 14 is arranged at least partially within the head section 4.

According to FIG. 1, the energy converter 14 is configured as a rotationally symmetric body, the shape of the energy converter 14 corresponding substantially to the shape of a mushroom or a screw. The energy converter 14 is oriented relative to the light conductor 5 such that the laser beam 10 exiting the exit opening 7 impinges thereon. For absorbing the laser beam 10, the energy converter includes an absorption disk 15. The absorption disk 15 is oriented orthogonally relative to the laser beam 10, with the laser beam 10 extending along an axis of rotation 16 of the energy converter 14 according to FIG. 1. A conductor section 17 extends from the absorption disk 15. According to FIG. 1, the conductor section 17 extends into the interior of the soldering tip 11 almost up to the head 12.

An external thread portion 18 is formed at a front end of the conductor section 17. The external thread portion 18 is adapted to be screwed into an internal thread portion formed in the soldering tip 11 so as to fix the energy converter 14 in position in the soldering tip 11. Alternatively, the energy converter 14 may be formed integrally with the soldering tip 11, e.g., by a casting process.

FIG. 1 also shows a distance "A" provided between the exit opening 7 of the light conductor 5 and a focus 20 on an absorption surface 21 of the absorption disk 15. According to the invention, the soldering iron 1 is configured such that the distance A cannot be changed. The laser light energy introduced at the focus 20 and conveyed by means of the laser beam 10 thus remains constant. According to the invention, the energy converter 14 is provided for absorbing the laser beam 10, whereby it is strongly heated and heats the soldering tip 11 coupled thereto.

For improved absorption of the laser beam 10 the absorption surface 21 of the absorption disk 15 may include a black surface 22, at least in an area of the focus 20.

According to FIG. 1, the absorption disk 15 includes a flat absorption surface 21. This, however, is not inevitably necessary, but the absorption surface 15 may also include an absorption surface 21 that is, at least partially, concave, in particular conical. It would thus be possible to absorb reflections 23 of the laser beam 10 in an area of the concave absorption surface.

Likewise, the head section 4 shown in FIG. 1 may be produced from a material that does not absorb any of the reflected laser beams 23 so as to prevent a rise in temperature of the head section 4. The same applies to the holder 6.

Although the laser beam 10 shown in FIG. 1 is conveyed within the soldering iron 1, at least along certain sections thereof, by means of the light conductor 5, the laser beam 10 may also be guided without the light conductor 5, i.e., without any additional conveying means, within the soldering iron 1 onto the absorption surface 21 of the energy converter 4.

Figure 2:
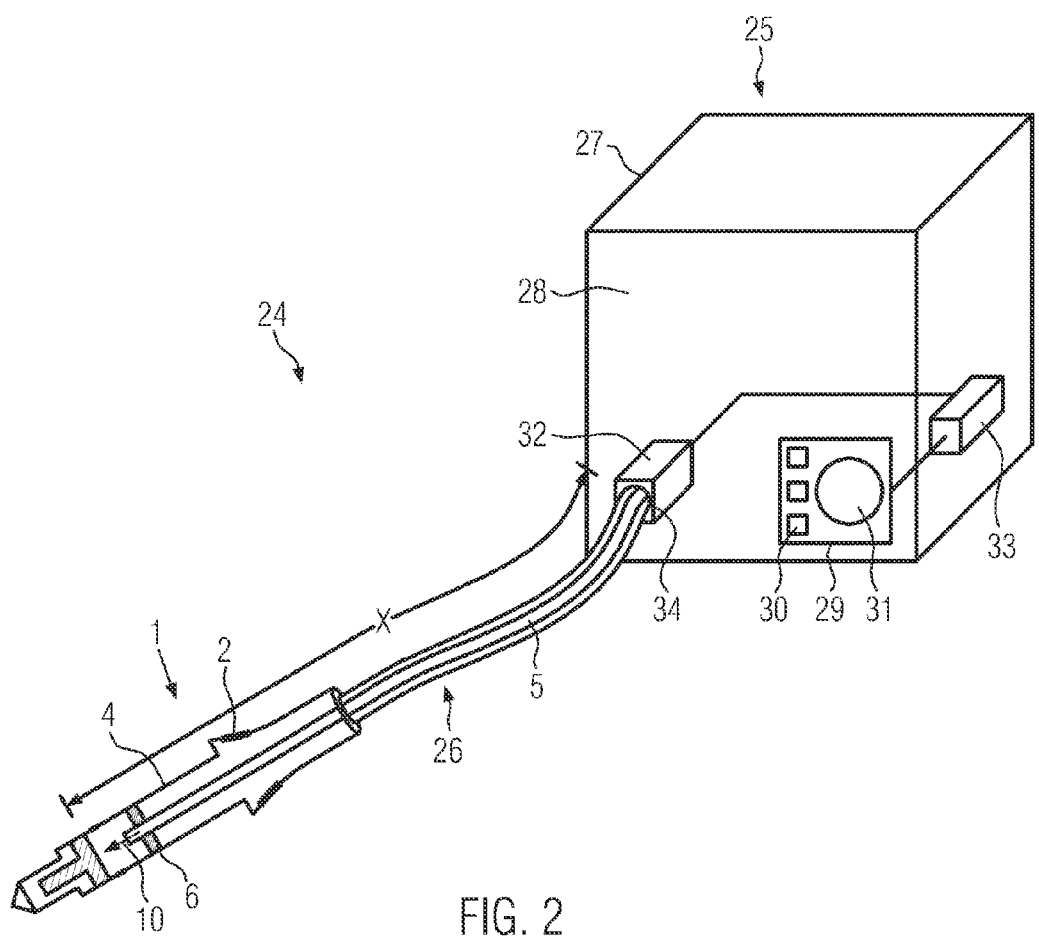
FIG. 2 shows an embodiment of the soldering system according to the present invention.

FIG. 2 shows a soldering system 24. The soldering system 24 comprises a soldering station 25 as well as the soldering iron 1, which is functionally connected to the soldering station 25 via a line 26. The soldering station 25 comprises a housing 27 with a display 28. The display 28 can be used for displaying operating parameters to the user. The soldering station 25 additionally comprises a control console 29 through which specific operating parameters for the soldering system can be set. For the purpose of setting, the control console may, by way of example, be provided with switches 30, e.g., with a rotary switch 31.

According to the embodiment shown in FIG. 2, a laser source 32 is provided within the soldering station 25. The laser source 32 is functionally connected to a power supply 33. The laser source 32 generates the laser beam 10 used for heating the soldering tip 11. The laser source 32 comprises a laser exit opening 34 coupled to one end of the line 26. The light conductor 5 extends in the interior of the line 26. According to the embodiment of FIG. 2, the light conductor 5 extends from the laser exit opening 34 along the line 26, through the handle 2 up to and into the interior of the head section 4. There, it is positioned by means of the holder 6. The laser beam 10 travels along a laser path X between the laser source 32 and the absorption surface 21 of the energy converter 14. As will be shown according to FIG. 3 further down, the laser path X can be reduced in length by providing the laser source 32 not in the laser station 25 but directly in the soldering iron 1.

According to FIG. 2, the laser beam 10 is generated within the soldering station 25, the laser beam 10 being adapted to be conveyed to the soldering iron 1 by means of the light conductor 5 within line 26. Due to the fact that the laser source 32 provided for generating the laser beam 10 is arranged within the soldering station 25 in FIG. 2, the total weight of the soldering iron 1 according to the present invention can be reduced substantially. The soldering iron 1 according to the present invention can thus be guided particularly easily by the user's hand. Due to the fact that a power supply for the soldering iron according to the present invention through line 26 is not provided in FIG. 2, also line 26 can be produced with reduced weight, whereby handling of the soldering iron 1 can be improved still further.

Figure 3:
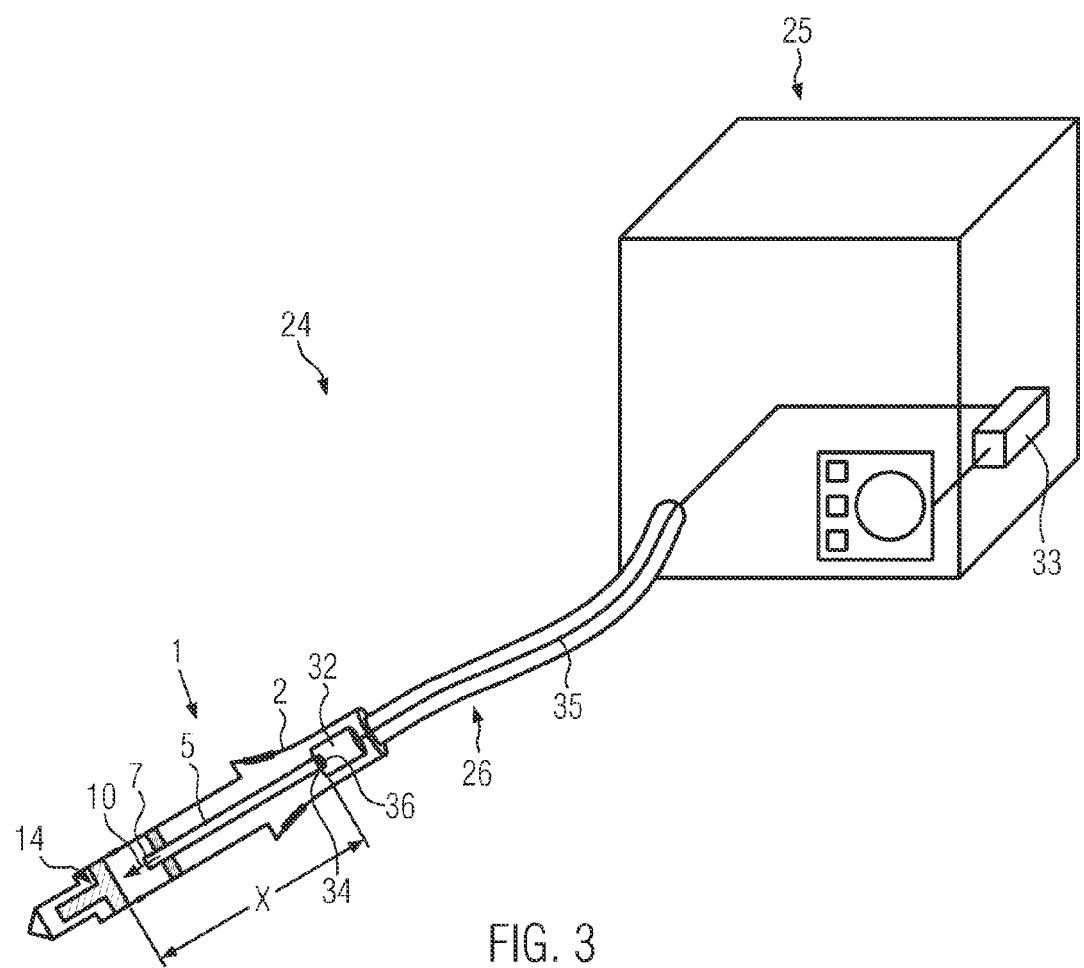
FIG. 3 shows a second embodiment of the soldering system according to the present invention.

Alternatively to FIG. 2, FIG. 3 shows a further embodiment of the present invention. The structural design of the soldering system 24 according to FIG. 3 is similar to that according to FIG. 2. According to FIG. 3, the soldering station 25 is connected via line 26 to the soldering iron 1 according to the present invention. In contrast to the embodiment shown in FIG. 2, the laser source 32 is, however, arranged directly in the soldering iron 1 in FIG. 3. The laser source 32 is here supplied with power from the power supply 33 by a supply cable 35 extending within the line 26. The laser source 32 is coupled to the light conductor 5 at the laser exit opening 34. At this laser exit opening 34 the laser beam 10 enters the light conductor 5, which is now reduced in length and which is used for conveying the laser beam 10 to the exit opening 7. At the exit opening 7, the laser beam 10 exits the light conductor 5 and is directed onto the energy converter 14. For generating the laser beam, the laser source 32 includes, according to FIG. 3, a laser diode 36 arranged in the area of the laser exit opening 34.

According to the embodiment shown in FIG. 3, the laser path X can be reduced substantially. The laser beam 10 may here pass rectilinearly along the laser path X, whereby an extremely high energy density, as well as an increased energy input at the energy converter 14, can be adjusted. According to FIG. 3, the laser source 32 is provided in the handle 2 of the soldering iron 1. The laser source 32 may, however, also be arranged at some other point within the soldering iron 1, e.g., in the head section 4.

According to the embodiment shown in FIG. 3, it would also be imaginable to direct, without making use of the light conductor 5 shown, the laser beam 10 directly onto the energy converter 14 by means of the laser exit opening 34. This may be of advantage especially in cases where the laser source 32 is arranged within the head section 4, whereby the length of the laser path X is reduced still further.

According to the present invention, the soldering tip 11 of the soldering iron 1 can quickly be heated to a desired operating temperature by means of the laser beam 10 conducted in the soldering iron 1. In particular, a constant and uniform transfer of heat to the soldering tip 11 can be accomplished, due to absorption of the laser beam 10, by means of the energy converter 14. The soldering iron 1 according to the present invention can be used for qualitative processing of workpieces.

The inventive principle, according to which the laser power generated by the laser beam is not transferred directly to the workpiece to be processed or the solder, but is first used for heating a component (energy converter and/or soldering tip) used for heat transfer, can also expediently be utilized for other tools.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A soldering iron, comprising:
   a soldering tip configured to be heated by a laser beam traveling at least partially along a laser path in the soldering iron;
   an energy converter configured to absorb the laser beam and coupled to the soldering tip for heating the soldering tip;
   wherein the energy converter is releasably connected to the soldering tip such that the energy converter may be non-destructively disconnected from, and reattached to, the soldering tip.

2. The soldering iron of claim 1, wherein the energy converter is in direct contact with the soldering tip.

3. The soldering iron of claim 1, wherein the energy converter comprises a thermally conductive material.

4. The soldering iron of claim 1, wherein the energy converter is at least partially enclosed by the soldering tip.

5. The soldering iron of claim 1, wherein the energy converter has a concave surface which faces the laser beam.

6. The soldering iron of claim 1:
   further comprising a light conductor disposed in the soldering iron and configured to convey the laser beam;
   wherein the light conductor comprises an exit opening disposed at a constant distance from at least on one of the energy converter and the soldering tip.

7. The soldering iron of claim 1, wherein the energy converter is produced from one or more of aluminum, iron, steel, stainless steel, silver, gold, nickel, copper, glass, ceramics, gel, a crystalline material, and liquid.

8. The soldering iron of claim 1, wherein the energy converter includes a conical absorption surface.

9. The soldering iron of claim 1, wherein a focus of the laser beam falls before, on, or behind a laser beam-absorbing surface of the energy converter.

10. The soldering iron of claim 1, wherein the energy converter is at least partially coated.

11. The soldering iron of claim 1, wherein the energy converter is at least partially black and/or roughened.

12. The soldering iron of claim 1, wherein the energy converter mounts to the soldering tip via a screw-type connection.

13. A soldering iron comprising:
   a soldering tip configured to be heated by a laser beam traveling at least partially along a laser path in the soldering iron;
   an energy converter configured to absorb the laser beam and coupled to the soldering tip for heating the soldering tip;
   a laser source disposed in the soldering iron.

14. The soldering iron of claim 13, wherein the laser beam is conducted from the laser source onto the energy converter directly.

15. A soldering system, comprising:
   a soldering station;
   a soldering iron;
   a line connecting the soldering station to the soldering iron;
   wherein the soldering iron comprises:

a soldering tip configured to be heated by a laser beam traveling at least partially along a laser path in the soldering iron;

an energy converter configured to absorb the laser beam and coupled to the soldering tip for heating the soldering tip;

wherein the soldering iron further comprises a laser source disposed in the soldering iron.

16. The soldering system iron of claim 15, wherein the energy converter is in direct contact with the soldering tip.

17. The soldering system of claim 15, wherein the energy converter is at least partially enclosed by the soldering tip.

18. The soldering system of claim 15, wherein the energy converter has a concave surface which faces the laser beam.

19. The soldering system of claim 15:

wherein the soldering iron further comprises a light conductor disposed in the soldering iron and configured to convey the laser beam;

wherein the light conductor comprises an exit opening disposed at a constant distance from at least on one of the energy converter and the soldering tip.

20. The soldering system of claim 15, wherein the laser beam is conducted from the laser source onto the energy converter directly.

\* \* \* \* \*